United States Patent [19]
Mason et al.

[11] 3,729,266
[45] Apr. 24, 1973

[54] APPARATUS FOR AUTOMATICALLY DIRECTING AND MAINTAINING A BEAM OF ELECTROMAGNETIC RADIATION RELATIVE TO EARTH HORIZONTAL

[75] Inventors: Mark T. Mason, South Lyndeboro; Kenneth G. Wood, Walpole, both of N.H.

[73] Assignee: Hamilton Kent Manufacturing Company, Kent, Ohio

[22] Filed: June 18, 1971

[21] Appl. No.: 154,434

[52] U.S. Cl. .................... 356/250, 33/46 B, 33/73 D, 356/149
[51] Int. Cl. .......... G01c 9/12, G01c 9/16, G01c 1/10
[58] Field of Search ..................... 356/148, 149, 153, 356/250; 33/46 AC, 46 B, 70 E, 73 D; 350/28

[56] References Cited

UNITED STATES PATENTS

| 2,557,340 | 6/1951 | Carbonara | 356/250 |
| 2,938,422 | 5/1960 | Hardy | 356/250 |
| 3,612,700 | 10/1971 | Nelson | 33/73 D |
| 3,013,464 | 12/1961 | Keuffel et al. | 356/250 |
| 3,522,993 | 8/1970 | Gabriet | 350/16 |
| 3,627,429 | 12/1971 | Jaenicke et al. | 356/153 |

Primary Examiner—Ronald L. Wibert
Assistant Examiner—V. P. McGraw
Attorney—Thomas N. Tarrant

[57] ABSTRACT

Apparatus for maintaining the direction of a beam of electromagnetic radiation relative to earth horizontal comprising an optical reflector, a pendulum connected to the reflector and a mounting frame supporting said reflector and said pendulum by independent gimbal suspension whereby said reflector moves responsive to pendulum motion through one-half the rotational angle of said pendulum, correcting an optical path in accordance with changes in the position of the pendulum relative to the mounting frame. Apparatus units utilizing coherent light beams are a specific embodiment.

13 Claims, 3 Drawing Figures

Patented April 24, 1973 3,729,266

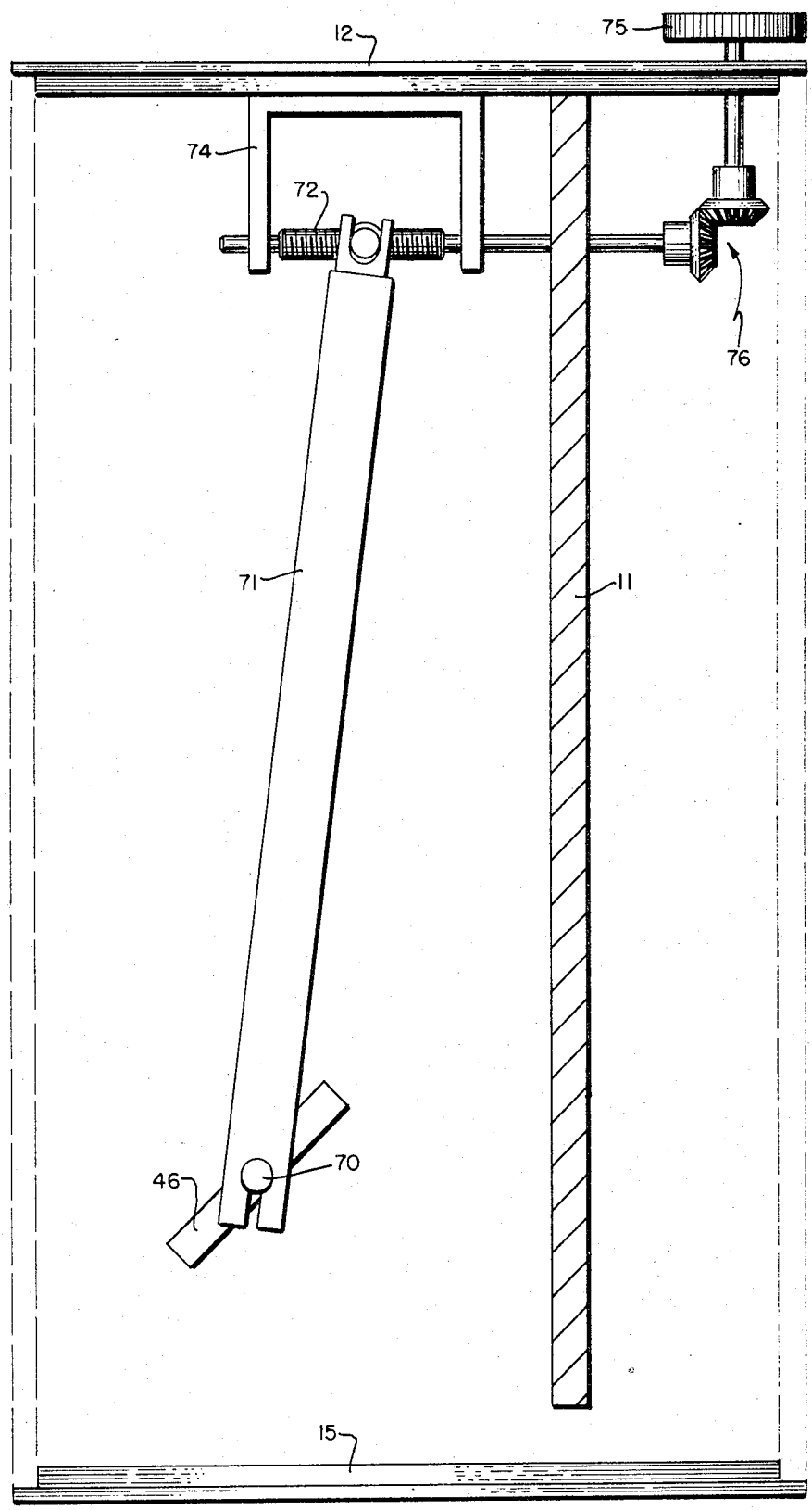

APPARATUS FOR AUTOMATICALLY DIRECTING AND MAINTAINING A BEAM OF ELECTROMAGNETIC RADIATION RELATIVE TO EARTH HORIZONTAL

BACKGROUND OF THE INVENTION

1. Field of the Invention

The invention relates to instruments and in the specific embodiment disclosed, to apparatus for automatically directing and maintaining a beam of electromagnetic radiation relative to earth horizontal which provides a tight collimated beam of light suitable for use as a guide in laying sewer pipe.

2. Description of the Prior Art

Recently, with the interest in lasers and coherent light, it has been found practical to use beams for various surveying purposes. One use that has become popular in civil engineering is in the laying of pipelines. An instrument known as a "Laser Transit" provides a tight intense beam readily visible in broad daylight for several hundred feet. The beam can be directed down a length of pipe line and intercepted on a target for showing the correct alignment for the next section. Since the pipeline is usually layed at a constant "grade", the transit must be "leveled" and then the beam must be tilted to the grade angle. Leveling of the instrument customarily involves fussing with adjustable mounting supports while observing spirit levels or plumb bobs. When it is necessary to move the instrument, the entire process must be repeated. Various configurations of systems have been tried in the past to produce self-leveling. These have been inevitably complicated by the additive effects of the angles of incidence and reflection. Thus it is not possible to achieve level correction simply with a single plane mirror directly coupled to a pendulum.

SUMMARY OF THE INVENTION

In accordance with the invention, an optical system has been found that provides automatic "leveling" of a beam. This beam may be a light beam or a radio frequency beam or other beam of electromagnetic radiation. This has been accomplished by suspending in the beam path a "correcting" mirror linked to follow the motion of a pendulum. Since the correcting mirror must swing through only one half the arc of the pendulum (angles of incidence and reflection are additive), the mirror and pendulum are mounted in independent gimbals. The term gimbal as used herein refers to a device having two mutually perpendicular and intersecting axes of rotation thus giving free angular movement in two directions and on which, objects may be mounted. Rotation may be on knife edges, suspension wires, or any of various bearing means. The mirror and pendulum are coupled at relative distances from the center of rotation to give the correct ratio.

Thus it is an object of the invention to provide automatic beam leveling in portable systems.

It is a further object of the invention to provide beam projecting apparatus with a system providing self-leveling of the projected beam.

It is a further object of the invention to define apparatus in which an element mounted in one set of gimbals is rotated by an element in a second set of gimbals at a ratio of rotation different from one to one.

It is a further object of the invention to provide self-leveling apparatus for automatically directing and maintaining the direction of a beam of electromagnetic radiation relative to earth horizontal.

It is still a further object of the invention to provide self-leveling apparatus of this type operated by a laser.

Further objects and features of the invention will become apparent upon reading the following disclosure together with the drawing.

BRIEF DESCRIPTION OF THE DRAWING

FIG. 3 A view along 3—3 of FIG. 2 showing the grade indexing mechanism, background omitted.

DESCRIPTION OF A PREFERRED EMBODIMENT

In the described embodiment, a laser-operated apparatus for automatically operating and maintaining the direction of a beam of electromagnetic radiation relative to earth horizontal provides a laser beam which remains at a fixed angle relative to earth horizontal irrespective of minor variations in the attitude of the transit.

Figure 1:
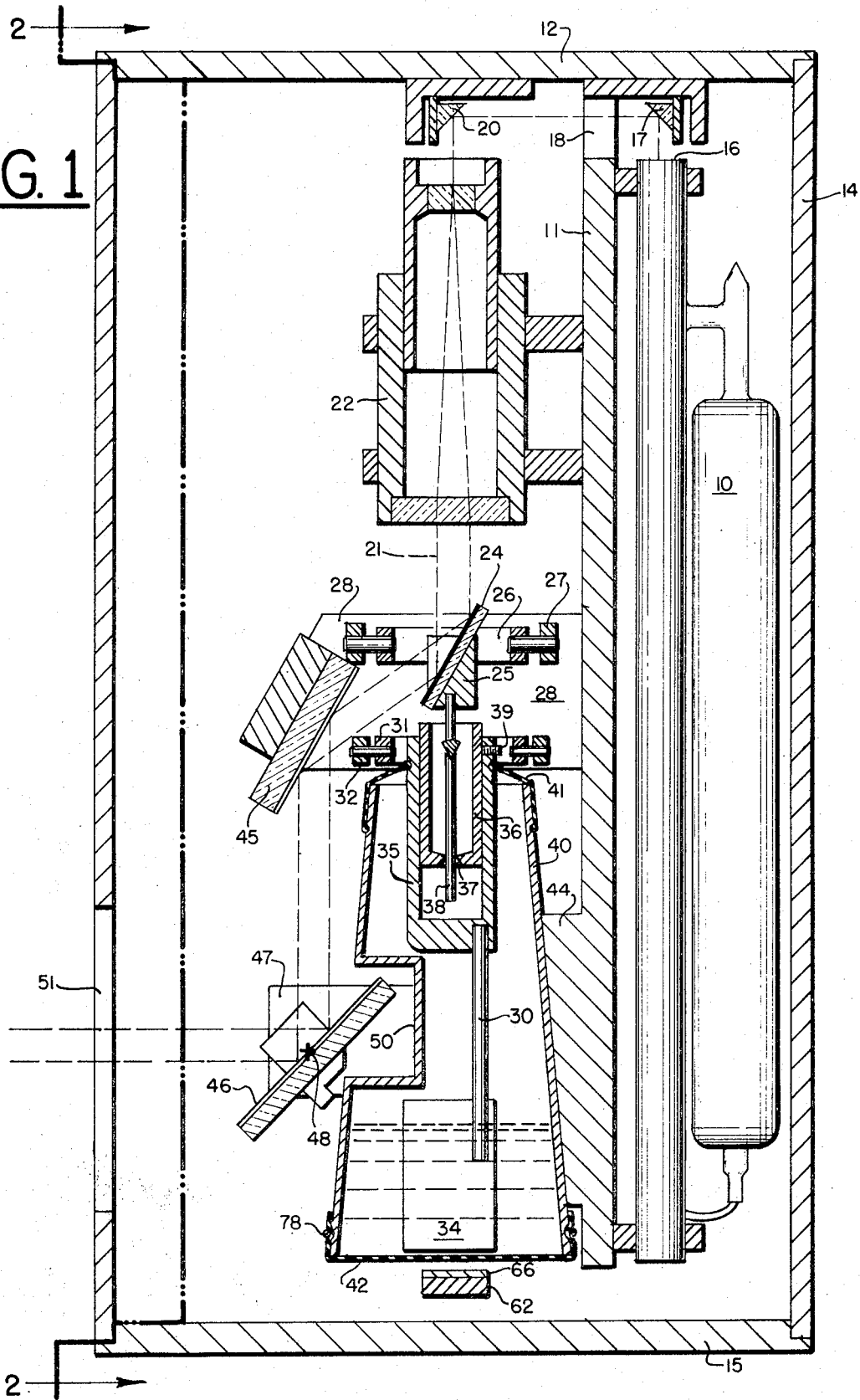
FIG. 1 A partially diagrammatic view in cross section of laser-operated apparatus for automatically directing and maintaining the direction of a beam of electromagnetic radiation relative to earth horizontal according to the invention.

Referring to FIG. 1, a helium-neon gas laser 10 is mounted on a supporting plate 11. Supporting plate 11 is secured orthogonally to a top plate 12 which becomes the cap of a cylindrical housing formed by cylindrical wall 14 and bottom plate 15. Laser 10 is a low power continuous arc gas laser available, for example, from Spectra-Physics Inc. of Mountain View, California. As depicted, the axis of the laser is vertical and the exit is located at the upper end 16. Mounted from top plate 12 immediately over upper end 16 is prism 17 which reflects the laser beam at a right angle through aperture 18 in supporting plate 11. Also mounted from top plate 12 is second prism 20 positioned to intercept the beam reflected from prism 17 through aperture 18. Second prism 20 is designed to reflect the laser beam through a second right angle downward along path 21 parallel to the laser axis. In path 21, optical telescope 22 is positioned mounted to supporting plate 11. Telescope 22 is suitably a ten power telescope which expands and then collimates the laser beam.

Correcting mirror 24 is positioned in path 21 following telescope 22. Mirror 24 is secured by a block 25 mounted on knife edges in ring 26. Ring 26 in turn is mounted in gimbal ring 27 on knife edges. Ring 27 is mounted on support member 28 secured to supporting plate 11. Thus mirror 24 rotates freely about two orthogonal axes, as a gimbal. These axes are mutually perpendicular with each other and with path 21.

Below mirror 24 is pendulum 30 similarly gimbal mounted. Ring 31 is mounted on knife edges in ring 32 which is mounted on support member 28. Pendulum 30 comprises a lower weighted member 34 and an upper cup-shaped member 35. Member 35 is secured in gimbal ring 31. Second cup-shaped member 36 is fitted slidably inside member 35 and secured in a fixed position by set screw 39.

The bottom of cup-shaped member 36 is closed except for central knife-edged aperture 37. Cylindrical rod 38, inflexibly secured at its top end in block 25, has its bottom end slidably carried in aperture 37. As shown, the distance between aperture 37 and the support of ring 31 is equal to the distance between the supports for rings 26 and 31 so that the mirror 24 at the support for ring 26 moves through one-half the angle of the motion of the pendulum 35–30–34.

Pendulum 30 is suspended in a truncated conical container 40 with first flexible membrane 41 sealing the top and second flexible membrane 41 sealing the bottom. Thus, the pendulum is free to oscillate in any direction in a conical volume. Container 40 contains a liquid for damping the motion of pendulum 30 such as a solution of water and alcohol. Various glycols are also suitable. The exact viscosity is not critical and it is only important to make sure that the liquid used does not facilitate corrosion or other deterioration of the materials.

Container 40 is supported from supporting plate 11 by strut 44. Intermediate mirror 45 is supported by support member 28 and positioned to reflect the beam received from mirror 24 onto exit mirror 46.

Exit mirror 46 is mounted on extensions 47 from plate 11. Mirror 46 is suspended for rotation about an axis 48 to correct for "grade" as will be described relative to FIG. 3.

Portion 50 of container 40 is recessed to allow rotation of mirror 46 as well as variation in the beam path from mirror 45 as required for self-leveling.

An aperture 51, suitably covered with glass or transparent plastic permits egress of the light beam. Other than aperture 51, the apparatus is completely enclosed by plates 12 and 15 together with wall 14.

Figure 2:
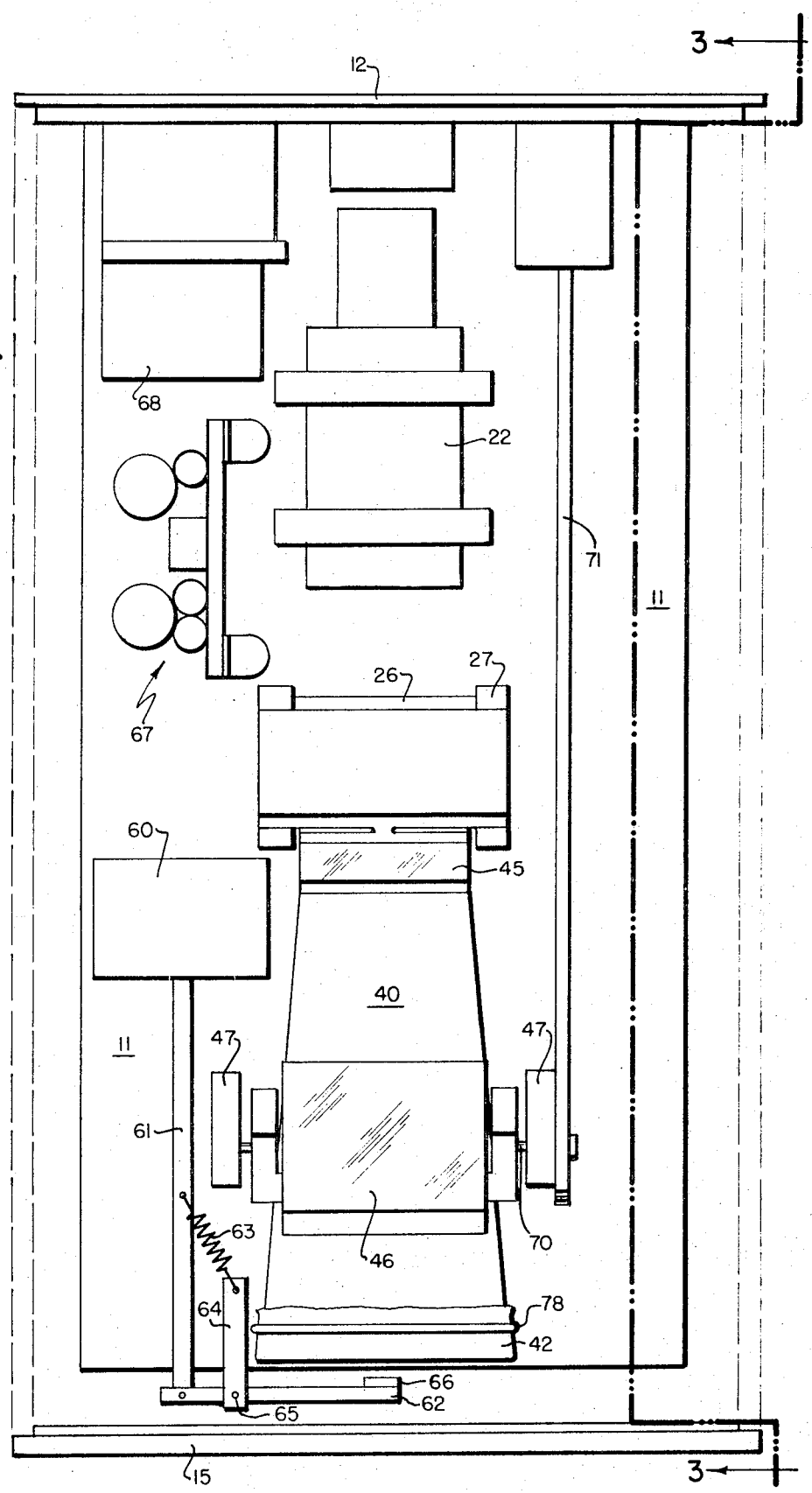
FIG. 2 A view along 2—2 of FIG. 1 showing the caging mechanism for the pendulum.

FIG. 2 is a view taken along line 2—2 of FIG. 1. FIG. 2 shows the caging mechanism for pendulum 30. Solenoid 60 has an armature 61 pivotally connected to a first end of bar 62. Bar 62 is secured by support 64 so that it may rock about a fulcrum point 65. The second end of bar 62 carries a pad 66 which pushes against membrane 42. Spring 63 holds armature 61 in an extended position forcing pad 66 against membrane 42. Pendulum 30 is caged by membrane 42 being forced against it.

Upon applying power to the apparatus, solenoid 60 retracts armature 61 releasing pendulum 30.

Power supply 67 provides power to laser 10. Digital counter 68 is driven by gearing (not shown) to indicate the grade angle as determined by exit mirror 46. The mechanism for changing the grade angle is depicted in more detail in FIG. 3.

FIG. 3 is a view taken along line 3—3 of FIG. 2. Exit mirror 46 is secured to a rotatable shaft 70. Shaft 70 can be rotated a limited amount by arm 71 driven by lead screw 72.

Lead screw 72 is secured to top plate 12 by frame 74. Lead screw 72 is rotated by knob 75 connected at right angles through a pair of bevel gears 76.

Flexible membrane 42 is secured in place on container 40 by strap 78.

For operation, the apparatus is placed in position for use within approximately five degrees of vertical. When the instrument is activated, pendulum 30 is automatically uncaged by operation of solenoid 60 and laser 10 produces a beam. The path of the beam from laser 10 is folded by a first 90° reflection from prism 17 and a second 90° reflection from prism 20 into telescope 22. After passing through telescope 22, the beam is reflected by mirror 24 onto mirror 45 and then to exit mirror 46. Exit mirror 46 directs the beam out through aperture 51 of wall 14.

When the instrument is off-level, pendulum 30 compensates by moving mirror 24 so as to bring the exit beam level. Mirror 24 is adjusted to rotate through one-half the angle of pendulum 30 by adjusting the position of cup-shaped member 36. This adjustment is made by loosening set-screw 39 securing member 36 to pendulum 30 and sliding member 36 up or. Member 36 is moved down on pendulum 30 until the relative angles for rotation are obtained.

The grade adjustment to mirror 46 can be made at any time before or after the apparatus is positioned. Digital counter 68, which serves as a calibrator, indicates the grade angle in degrees to the desired number of decimal places responsive to rotation of knob 75.

While the invention has been described with relation to a laser instrument, it is equally applicable to other embodiments in which it is desired to control the direction of an electromagnetic beam relative to earth horizontal. Thus the invention may be used for controlling any directive light or radio frequency or other electromagnetic beam relative to earth horizontal. Accordingly it is the intention to claim the invention broadly within the spirit and scope of the appended claims.

I claim:

1. Apparatus for directing and maintaining the direction of a beam of electromagnetic radiation relative to earth horizontal which comprises a housing, said housing containing and supporting:
   a. a source for projecting a beam of electromagnetic radiation,
   b. means for shaping and directing said beam,
   c. means for self-leveling the beam comprising (1) a rotatable reflector which intercepts and re-directs said beam and (2) a pendulum rotatable in a conical volume, said pendulum being spaced from said source and controlling the angular position of said reflector whereby said beam will follow a predetermined angle relative to earth horizontal irrespective of minor variations in the attitude of said housing.

2. Apparatus according to claim 1 in which said source is a laser, and there is interconnecting means between said reflector and said pendulum driving said reflector through one-half the angular displacement of said pendulum.

3. Apparatus according to claim 1 wherein said reflector is mounted by a first gimbal and said pendulum is suspended by a second gimbal.

4. Apparatus according to claim 2 wherein said interconnecting means is a rod fixed rigidly with said reflector and coupled loosely with said pendulum.

5. Apparatus according to claim 1 further comprising a second reflector positioned to intercept said beam from said rotatable reflector and means for adjusting the angle of said second reflector to set said predetermined angle.

6. The apparatus of claim 5 in which the adjustment means is calibrated.

7. Apparatus for correcting the position of a beam of electromagnetic radiation relative to earth horizontal comprising:
   a. a rotatable reflector positioned to intercept said beam at an angle;
   b. a gimbal supporting said rotatable reflector for rotation about two mutually perpendicular axes;
   c. a pendulum;
   d. a gimbal suspending said pendulum so as to permit free movement within a conical volume;
   e. coupling means coupling said rotatable reflector to said pendulum so as to rotate said rotatable reflector through one-half of the angle moved by said pendulum.

8. Apparatus according to claim 7 in which said coupling means comprises a rod, means rigidly coupling said rod to said rotatable reflector and means loosely coupling said rod to said pendulum.

9. Apparatus according to claim 8 wherein said means loosely coupling said rod to said pendulum comprises means containing a knife-edged aperture with said rod slidably positioned therethrough.

10. Apparatus according to claim 7 wherein said pendulum is supported in a container of damping liquid.

11. Apparatus according to claim 10 further comprising means for rendering said pendulum immovable.

12. Apparatus according to claim 7 comprising a reflector with calibrated adjustment means for intercepting a beam from said rotatable reflector and directing it from said apparatus at a calibrated angle with respect to earth horizontal.

13. Apparatus according to claim 7 in which the distance between the axes of the gimbals is equal to the distance from the axis of the second-mentioned gimbal to the location where the coupling means contacts the pendulum.

* * * * *